(12) United States Patent
Chen et al.

(10) Patent No.: US 7,924,765 B2
(45) Date of Patent: Apr. 12, 2011

(54) METHOD AND SYSTEM FOR IMPROVED WIRELESS COMMUNICATIONS PAYLOAD

(75) Inventors: Chia-Tung Chen, Richmond (CA); Sukhdeep Hundal, Surrey (CA)

(73) Assignee: VTech Telecommunications Limited, Hong Kong (HK)

( * ) Notice: Subject to any disclaimer, the term of this patent is extended or adjusted under 35 U.S.C. 154(b) by 1813 days.

(21) Appl. No.: 11/065,056

(22) Filed: Feb. 25, 2005

(65) Prior Publication Data

US 2006/0193281 A1 Aug. 31, 2006

(51) Int. Cl.
*H04B 7/216* (2006.01)

(52) U.S. Cl. ........ 370/321; 370/337; 370/347; 370/348; 370/442; 370/443; 370/444

(58) Field of Classification Search .................. 370/321, 370/337, 347, 348, 442, 443, 444
See application file for complete search history.

(56) References Cited

U.S. PATENT DOCUMENTS

| | | | | |
|---|---|---|---|---|
| 3,700,820 A * | 10/1972 | Blasbalg et al. | ............... | 370/468 |
| 4,635,248 A * | 1/1987 | Yoshida | ......................... | 370/306 |
| 5,802,311 A * | 9/1998 | Wronski | ......................... | 709/236 |
| 6,404,755 B1 * | 6/2002 | Schafer | ......................... | 370/338 |
| 6,553,424 B1 * | 4/2003 | Kranz et al. | ................... | 370/330 |
| 6,704,324 B1 * | 3/2004 | Holmquist | ..................... | 370/465 |
| 6,778,670 B1 * | 8/2004 | Sharma et al. | ................. | 380/262 |
| 6,987,982 B2 * | 1/2006 | Willenegger et al. | .......... | 455/515 |
| 7,274,725 B2 * | 9/2007 | Kockmann et al. | ........... | 370/337 |
| 2003/0002637 A1 * | 1/2003 | Miyauchi et al. | ........... | 379/93.01 |
| 2004/0051656 A1 * | 3/2004 | Pavicic | .......................... | 341/155 |
| 2005/0186921 A1 * | 8/2005 | Hoo et al. | ...................... | 455/121 |
| 2005/0232219 A1 * | 10/2005 | Aiello et al. | .................... | 370/348 |
| 2006/0068814 A1 * | 3/2006 | Cheng et al. | ................... | 455/466 |
| 2006/0198325 A1 * | 9/2006 | Gao et al. | ....................... | 370/270 |
| 2008/0215956 A1 * | 9/2008 | Williamson et al. | .......... | 714/785 |
| 2008/0310479 A1 * | 12/2008 | Koslar et al. | ................... | 375/131 |

FOREIGN PATENT DOCUMENTS

JP 362131636 A * 6/1987 ..................... 714/797

\* cited by examiner

*Primary Examiner* — Daniel J Ryman
*Assistant Examiner* — Jay P Patel
(74) *Attorney, Agent, or Firm* — McAndrews, Held & Malloy, Ltd.

(57) ABSTRACT

A system and method for improved data transmission in a WDCT frame structure. A transmission slot in a WDCT frame of conventional size is configured for transmission of data bits having substantially smaller data bit width than used in conventional WDCT frames. A user data field is configured to transmit a larger data payload by including more bits within the user data field. In one implementation, the user data field is configured for transmission of multiple copies of a voice data packet at the same rate as single data packets are transmitted in a conventional WDCT frame structure. In another implementation, a non-voice data transmission rate is increased by more than a factor of two over conventional WDCT frame structure.

22 Claims, 8 Drawing Sheets

METHOD AND SYSTEM FOR IMPROVED WIRELESS COMMUNICATIONS PAYLOAD

BACKGROUND

1. Field of the Invention

The present invention relates generally to wireless communications systems. More particularly, the present invention relates to systems for improved data transmission in wireless communication frames.

2. Background

Time division multiple access (TDMA) wireless RF communications standards such as worldwide digital cordless telecommunications (WDCT) establish wireless communication that enable multiple parties to communicate over a wireless link by partitioning of a basic communication frame into smaller units, often called slots. During one communication frame, different parties can each communicate with the same third party, for example, by each using one particular slot of the frame. The WDCT standard is particularly useful in applications such as cordless telephony where accuracy of voice communication is important. An added feature employed by the WDCT standard is frequency hopping, which helps ensure rapid avoidance of interference from other RF sources (e.g., WiFi, 802.1 lb/g) that may be operating nearby, as well as providing intrinsic security without data/voice encryption. For the above reasons, WDCT has emerged as a useful technology for home and office settings in which many RF-communications appliances may be present. However, the raw data carrying capacity of WDCT transmissions is limited to 32 kilobits per second (bps) based on the conventional WDCT design used for carrying 8 KHz audio streams.

Conventional WDCT was developed for cordless phones using adaptive differential pulse code modulation technology, which provides good quality voice reproduction at 8 KHz transmission rates. However, with the proliferation of other sources of RF communications, for one, there is a need to improve voice communication over WDCT communications links. Furthermore, WDCT devices employed to carry data other than voice data are limited in bandwidth as discussed above. This latter fact severely limits the ability to use WDCT devices for applications such as multimedia where higher bandwidth is desirable.

In light of the foregoing, it will be appreciated that a need exists to improve WDCT communications.

SUMMARY OF THE INVENTION

In one embodiment of the present invention, a system for improved wireless communication includes a communications frame structure having increased data transmission capability using a standard set of frame and slot boundaries employed by a TDMA technology. Preferably, the TDMA technology is the WDCT standard. Preferably, a bit width of a transmitted data bit is about 0.86 μs, rather than a conventional 1.7 μs size. In an exemplary aspect, the frame structure contains two voice data fields in a standard-duration transmission slot. A first voice data field contains a first copy of a first set of voice data. A second data field contains a second copy of a second set of voice data field transmitted in a previous frame. Accordingly, each set of voice data is transmitted twice during successive frames, improving quality of voice transmission over a conventional WDCT frame structure.

In another exemplary embodiment, a frame structure with a standard-duration transmission slot contains a voice data field with built-in forward error correction. Error correction is incorporated without increasing the duration of the voice data field over that of a standard WDCT frame structure, due to the reduced bit width. In an exemplary embodiment, the voice data field is configured to allow up to 3 parity bits for every 32 bits of voice data.

In a further exemplary embodiment, a transmission slot of standard duration is configured to double the transmission rate (also termed "payload") of non-voice user data. Preferably, minimal changes are employed for non-user data fields such as sync fields and Z-fields. Accordingly, non-voice user data can be transmitted at rates of up to 80 kilobits per second for single slot transmission.

In another embodiment of the present invention, a system for improved wireless communication includes a communications frame structure having an enhanced double extended time slot structure contained in a WDCT frame of standard duration. An enhanced extended double slot of the enhanced structure spans a duration of two standard transmission slots plus a single guard slot. By transmitting using a bit width of 0.86 μs, the enhanced extended double slot contains 2400 available bits. In one aspect, the enhanced extended double slot includes three voice data fields of equal size configured for transmission of a single voice data packet three times. Preferably, each enhanced extended double slot contains a first copy of a first voice data packet, whose second and third copies are transmitted in an immediately subsequent frame, and a frame just after the immediately subsequent frame; a second copy of a second data packet, the first copy of which is transmitted in an immediately preceding frame, and third copy of which is transmitted in the immediately subsequent frame; and a third copy of a third data packet, whose second and first copies are transmitted in the immediately preceding frame and frame just prior to the immediately preceding frame, respectively. Accordingly, a voice data packet can be transmitted at effectively the same bit rate as those achieved by a conventional WDCT frame structure, but with greatly enhanced resilience against time based interference.

In another aspect, the enhanced extended double slot includes an enhanced data slot configured for transmitting non-voice user data. Data is preferably transmitted in the enhanced data slot at a bit width of 0.86 μs, affording a user data transmission rate of up to about 2200 bits per frame, equivalent to 220 kbps.

In another embodiment of the present invention, a method for improved wireless communication of a data packet using a WDCT frame structure includes decreasing a bit width used for transmission of data bits. Preferably, the bit width used for data transmission is about 0.86 μs. A first copy of the data packet is transmitted in a first user data field within an enhanced transmission slot of first frame. Preferably, the first data packet size is at least as large as a data packet size used in a conventional WDCT frame structure. Preferably, the data packets are voice data packets. A second data copy of a second data packet is transmitted in a second user data field of the enhanced transmission slot. A second data copy of the first data packet is transmitted in a first user data field in the enhanced transmission slot during an immediately subsequent time frame. In addition, a first copy of a third data packet is transmitted in the enhanced transmission slot of the immediately subsequent time frame. The first and second copies of the first data packet are stored in a buffer at a receiver. A best copy of the first data packet is loaded for playback at the receiver.

DETAILED DESCRIPTION OF THE INVENTION

Figure 1:
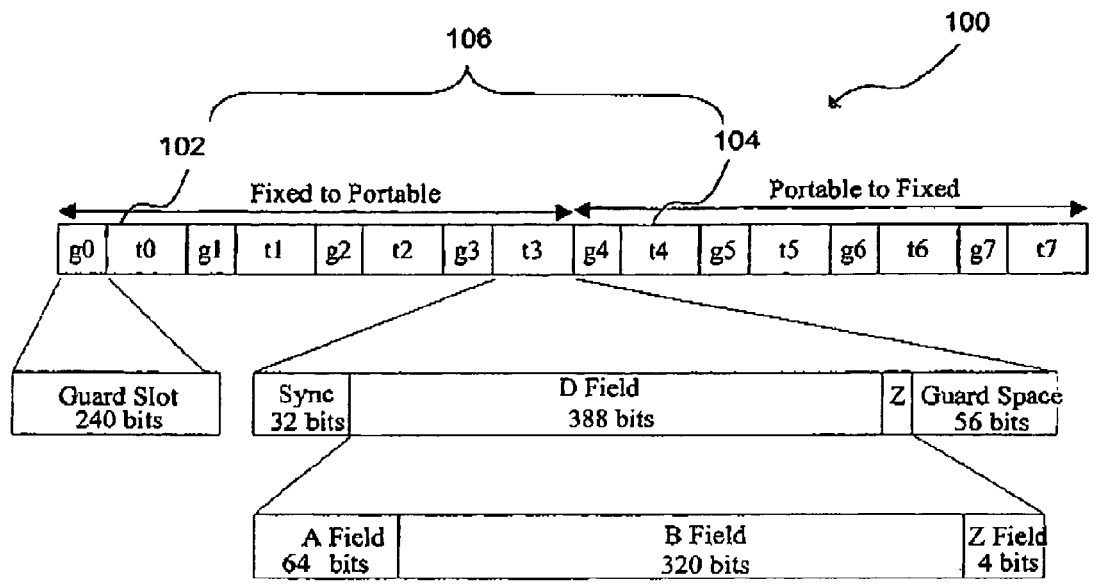
FIG. 1 illustrates a single frame of a known WDCT frame structure.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

In the following discussion, for purposes of convenience and clarity, aspects of the present invention are compared to known specific features of known WDCT frame structures. FIG. 1 illustrates a single frame 100 of a known WDCT frame structure widely used for WDCT communications. The term frame, as used hereinafter, refers to a unit of WDCT communication that includes one set of portable-to-fixed unit transmission slots and one set of fixed unit-to-portable transmission slots. Frame 100 spans a duration that is standard for WDCT of 10 ms and includes four of the former and four of the latter transmission slots. Transmission slots are bounded by guard slots, so that a total of eight of each are present within the single frame. The period from the beginning of one transmission slot to the next is about 1260 μs, with each transmission slot spanning about 840 μs. In a standard implementation, communication is set up over a duplex link between a fixed and portable unit, such that four separate duplex links are established, each link containing one each of the four portable-to-fixed unit slots and one each of the four fixed-to-portable unit slots within a frame. For example, slot 102 together with slot 104 comprise a single link 106 between a fixed unit and portable unit.

As illustrated in FIG. 1, each transmission slot contains a Sync-field, D-field (data field), Z-field and guard space. FIG. 1 also illustrates an example where the D-field is further divided in the case of voice data transmission into an A-field for transmission of control data information, as well as a B-field for transmission of user voice data. Alternatively, in the case of non-voice data transmission, the D-field contains the A-field and a field for non-data voice transmission.

In the example of FIG. 1, the bit width is 1.7 μs and the D-field of each transmission slot for a voice transmission contains 388 bits spanning a duration of 681 μs. Subtracting A-field bits, Z-CRC in the Z-field, and a 4-bit X-CRC at the end of the B-field leaves 320 bits for user voice data in each transmission slot. Thus, a single link of frame is capable of user voice data transmission of 320 bits per frame, or 32 kbps. When a WDCT duplex link is set up between two devices, the two devices occupy a single link in each frame, so that the transmission rate of user data is typically no greater than about 32 kbps between the two devices.

Single Transmission Slot Frame Structure

Embodiments of the present invention discussed below include slot structures in which the bit size of fields of user data is substantially increased over that available in conventional WDCT. In some embodiments the increased bit size of user data fields is used to provide multiple fields containing user data, while in other embodiments the size of a single user data field is increased. As used herein, the term "user data" refers to data meant to supply information to a user such as voice or audio data, text, video or graphics data, and the like, as opposed to, for example, synchronization data. The term "user data field" refers to a field in a time slot that contains a substantial portion of user data. In some cases a user data field may include multiple individual data fields within a transmission slot. For example, a "user data field" may contain two individual B-fields used for communication of the same or different voice data packets. In some cases, a "user data field" can be further sub-divided into user data blocks and non-user data blocks, for example voice data blocks and parity bit blocks.

Figure 2:
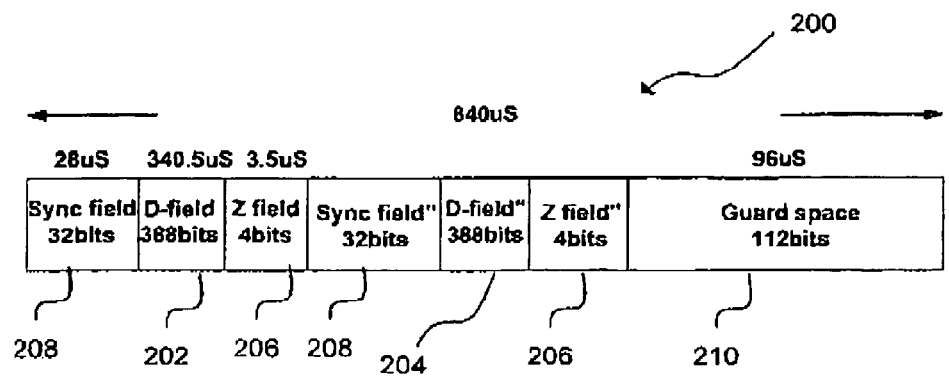
FIG. 2 illustrates an exemplary WDCT transmission slot, arranged according to one embodiment of the present invention.

FIG. 2 illustrates an exemplary WDCT transmission slot 200, arranged according to one embodiment of the present invention. Transmission slot 200 can be a fixed-to-portable slot or portable-to-fixed slot. For the purposes of simplicity, in this example and the examples to follow, however, the discussion will be set forth from the perspective of a fixed-to-portable unit transmission, except as otherwise noted or where inapplicable. In addition, it will be assumed unless otherwise indicated, that a guard slot of about 420 μs duration exists immediately before and after each transmission slot. In an exemplary embodiment, transmission slot 200 spans an 840 μs duration and is contained in an otherwise conventional 10 ms WDCT frame having eight similar transmission slots that provide for four duplex links, as discussed above.

In slot 200, a bit width of a transmitted data bit is about 0.86 μs rather than a conventional 1.7 μs size used in known WDCT systems. Data transmission using a 0.86 μs bit width can be accomplished using known hardware widely employed in WDCT systems. In the example shown in FIG. 2, slot 200 contains two D-fields 202 and 204, each containing 388 bits, and each associated with a Z-field 206 and Sync-field 208. In addition, frame 200 contains a guard space 210. Preferably, slot 200 is configured for voice data transmission. In an exemplary embodiment, D-fields 202 and 204 are configured to transmit the same voice data. Thus, a conventional size 388 bit D-field voice data packet, containing 320 bits of B-field user voice data, can be sent twice within transmission slot 200. For the standard 840 μs WDCT transmission slot size, the data payload of user data is effectively 640 bits/frame, double the 320 bits/frame that is achieved over a single slot in a conventional WDCT structure.

Figure 3:
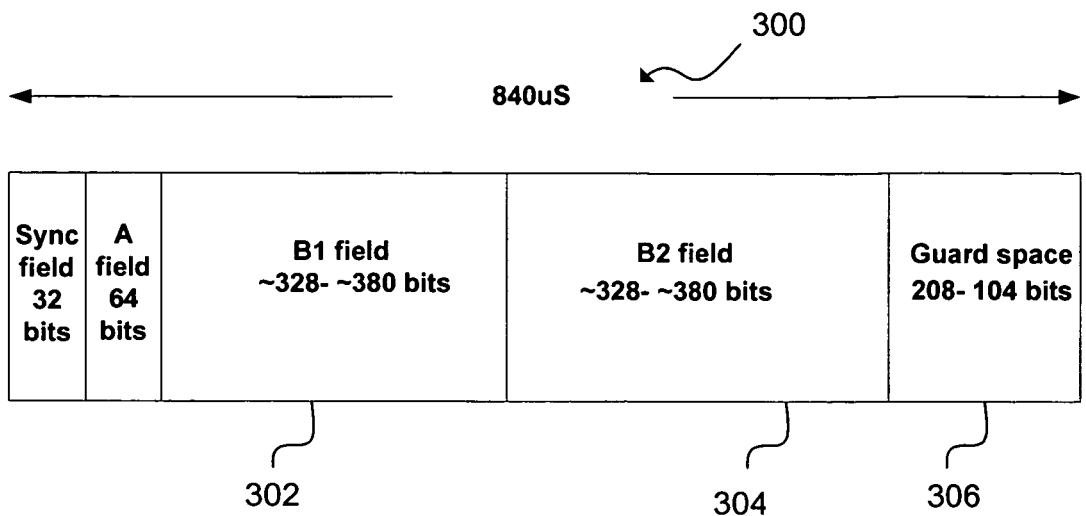
FIG. 3 illustrates an exemplary embodiment of the present invention containing redundant data fields for redundant data transmission.
Figure 3A:
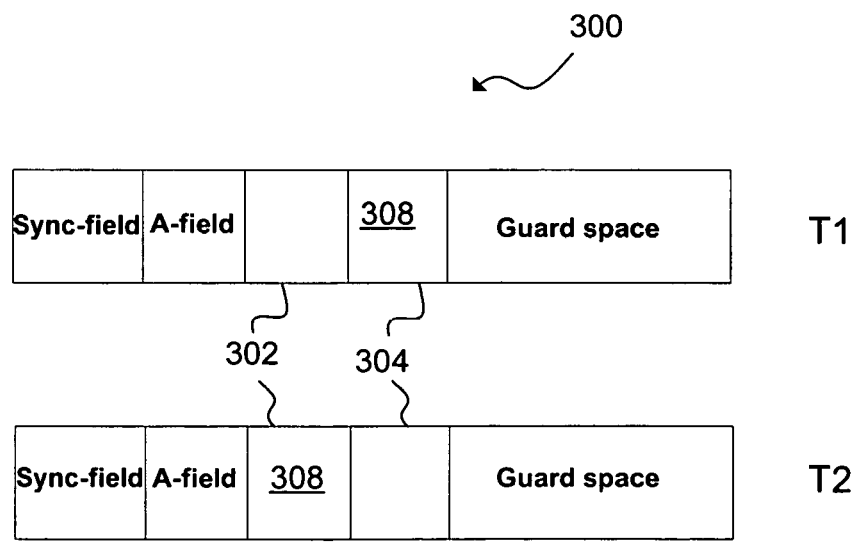
FIG. 3a illustrates an exemplary slot structure in which the redundant data fields of FIG. 3 contain a parity bit in addition to voice data.

FIG. 3 illustrates another exemplary embodiment in which transmission slot 300 contains two B-fields 302 and 304 used to transmit the same data packet twice. Slot 300 does not contain redundant A-fields as in the example of FIG. 2. In addition, as illustrated in FIG. 3a, slot 300 is configured such that a given data packet 308 is transmitted in B-field 304 in a first frame (T1) and retransmitted in B-field 304 in the next frame (T2). Thus, a given data packet is transmitted twice in consecutive frames with an interval between transmissions corresponding to the standard WDCT frame duration of approximately 10 ms. Thus, if a first copy of the data packet is damaged during transmission in frame T1, for example, from RF interference occurring at or near transmission frequency of the first packet, a second copy is sent in the next frame, allowing for the second copy to be transmitted at a hopping frequency hopefully removed from the interfering frequency.

Figure 3B:
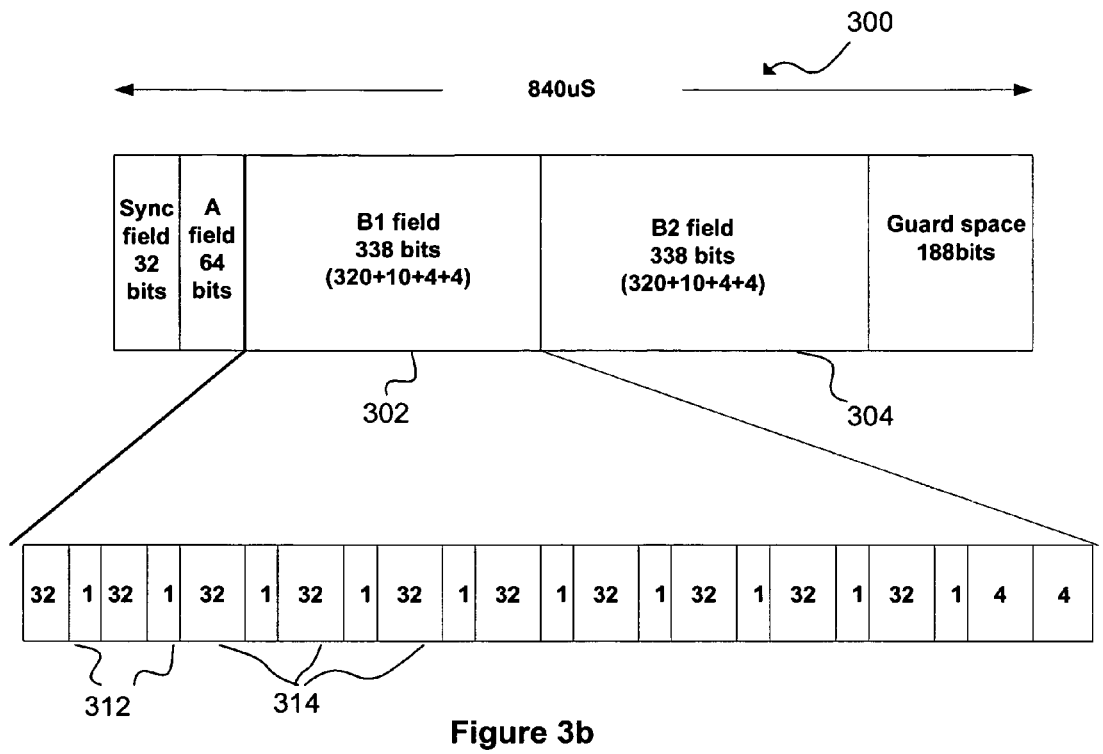
FIG. 3b illustrates another exemplary slot structure in which the redundant data fields of FIG. 3 contain parity bits in addition to voice data.

FIG. 3b illustrates an exemplary embodiment in which B-fields 302, 304 contain a parity bit 312 that is transmitted between every 32 bits of voice data 314. In this example, as in that shown in FIG. 2, voice data packets are transmitted redundantly in B-fields 302 and 304 at a similar effective rate as a single transmission of voice data packets in conventional WDCT frame structures (32 Kbps).

Figure 3C:
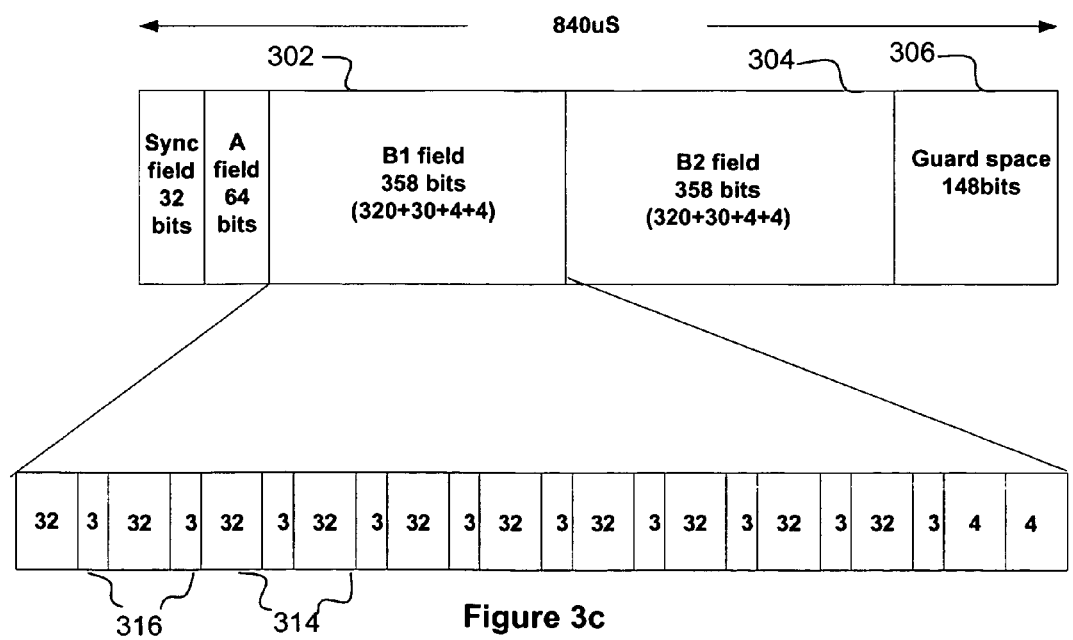
FIG. 3c illustrates another exemplary slot structure in which the redundant data fields of FIG. 3 contain 3-bit parity bit blocks, in addition to voice data.

In an alternative embodiment using the general slot structure of FIG. 3 shown in FIG. 3c, a block 316 containing three parity bits is transmitted between each 32 bit data sub-packet. Sending of three parity bits provides for extra certainty by using "majority voting" to detect any errors. In this example, the extra bits needed for the extra parity bits are obtained by reducing a guard space 306, by an appropriate amount. Thus, a more reliable voice transmission can be effected in comparison to conventional WDCT frame structure.

Figure 4:
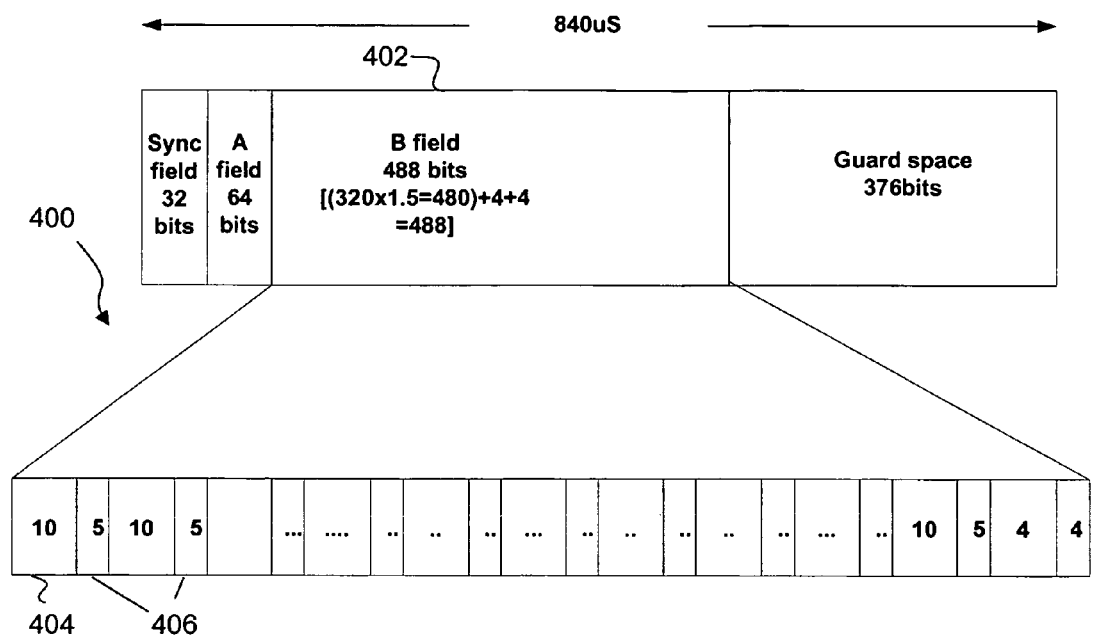
FIG. 4 illustrates an exemplary slot structure used for forward error correction of transmitted data.

In another exemplary embodiment of the present invention illustrated in FIG. 4, transmission slot 400 having conventional duration (840 μs) includes B-field 402 configured for forward error correction (FEC) of transmitted data. In this example, B-field 402 contains 320 bits of user data, for example, voice data, transmitted together with 160 correction bits. In the example illustrated in FIG. 4, 10-bit user data blocks 404 are transmitted alternately with 5-bit blocks 406 of correction bits. Preferably, FEC is based upon a known shortened Hamming code method. In this scheme, double errors in each block can be detected, and single errors corrected. In this manner, up to 32 single errors within a given transmission slot can be corrected.

Figure 4A:
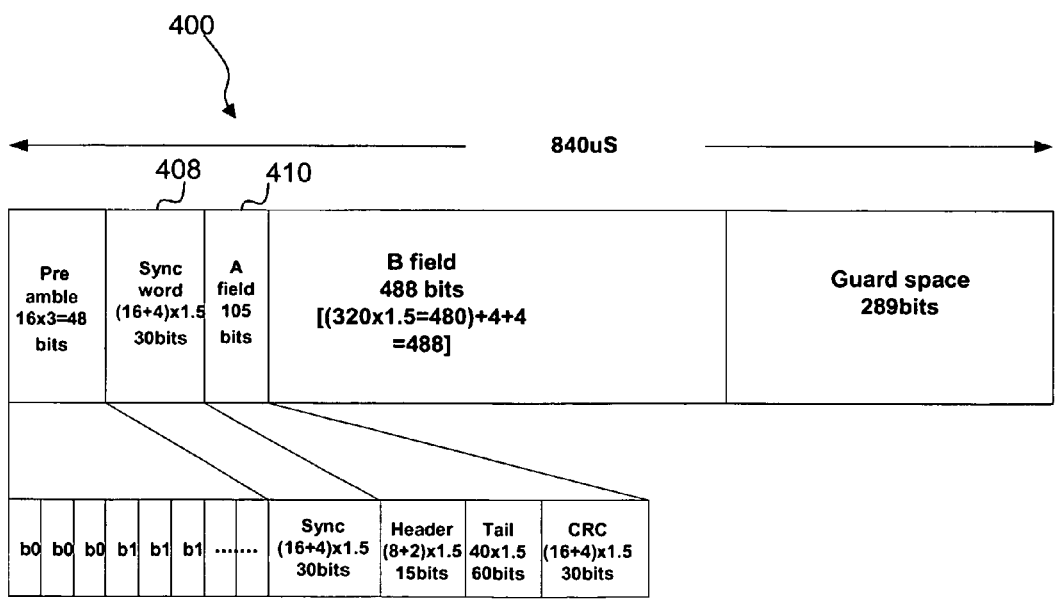
FIG. 4a illustrates a variant of the slot structure of FIG. 4, including an enhanced Sync-field and enhanced A-field.

In the exemplary embodiment illustrated in FIG. 4a, transmission slot 400 includes enhanced Sync-field 408 and enhanced A-field 410, that each have FEC capability.

Figure 5:
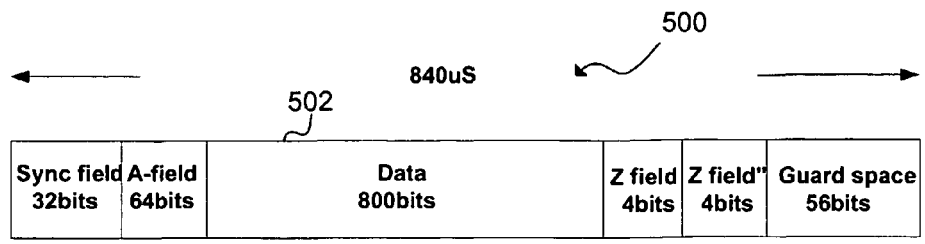
FIG. 5 illustrates a standard duration transmission slot, arranged according to an exemplary embodiment of the present invention.

In addition to enhancements to voice data transmission, embodiments of the present invention provide improved non-voice data transmission as compared to data transmission using conventional WDCT transmission slot structure. FIG. 5 illustrates a standard duration (840 μs) transmission slot 500 containing user data field 502, arranged according to an exemplary embodiment of the present invention. Data field 502 can be used, for example, to transmit video, message, graphic, or other data. In this example, data field 502 contains 800 0.86 μs bits, equivalent to a data transmission rate of 80 Kbps. In contrast, in a conventional single transmission slot implementation, as illustrated in FIG. 1, less than 400 bits of user data would be available to transmit non-voice data, for example. Thus, slot 500 could be used to transmit images or other non-voice data over a single transmission slot more effectively than can be accomplished with conventional WDCT technology.

Double Extended Slot Frame Structure

Figure 6:
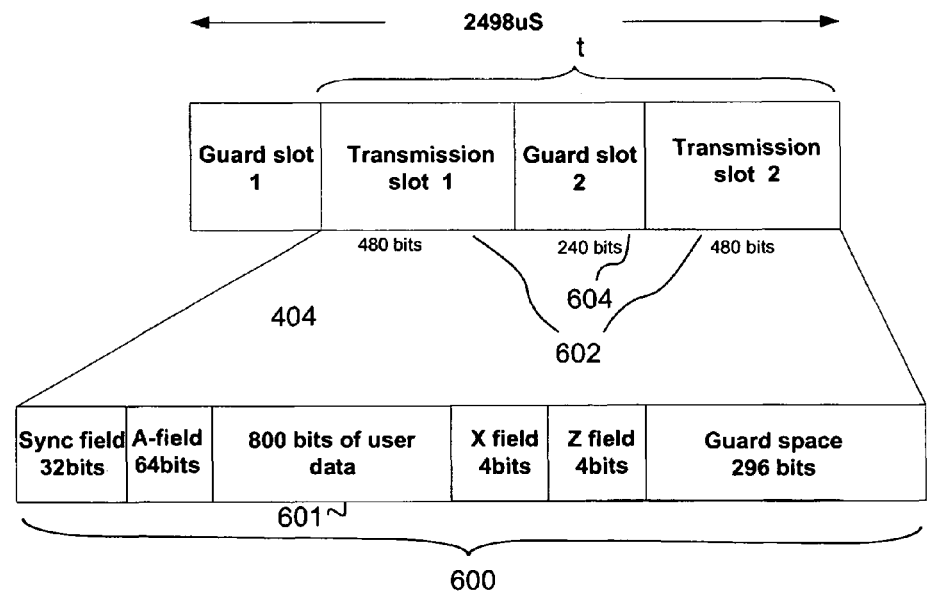
FIG. 6 illustrates a known WDCT frame arrangement employing a double extended slot frame structure.
Figure 6A:
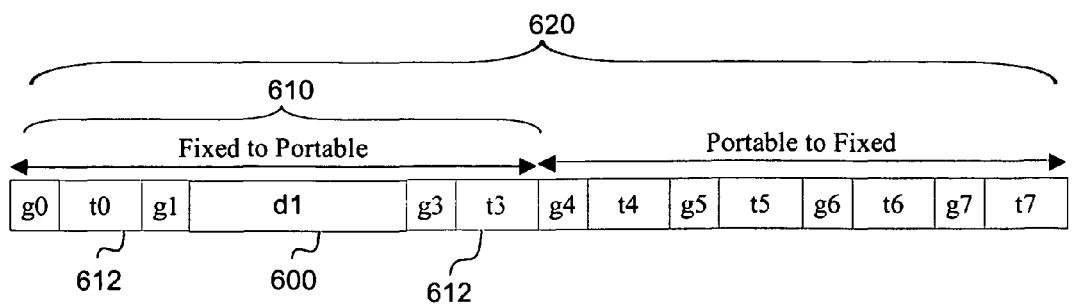
FIG. 6a illustrates details of the WDCT frame arrangement of FIG. 6.

FIG. 6 illustrates a known WDCT frame arrangement employing a so-called double extended slot frame structure. Double extended slot 600 spans the duration t of two conventional transmission slots 602 and one guard slot 604. Thus, as illustrated further in FIG. 6a, a WDCT frame having one double extended slot 600 in fixed-to-portable region 610, also has space for two other conventional single slot transmission slots 612. By occupying the space allocated to two single slots, extended slot 600 reduces the number of fixed-to-portable duplex links available in frame 620 to three from the conventional four found in single slot WDCT frame structure. However, an advantage of this arrangement is that the data rate can be increased. For example, user data slot 601 of double extended slot 600 has 800 bits, enabling 80 Kbps transmission rate of data.

Figure 7:
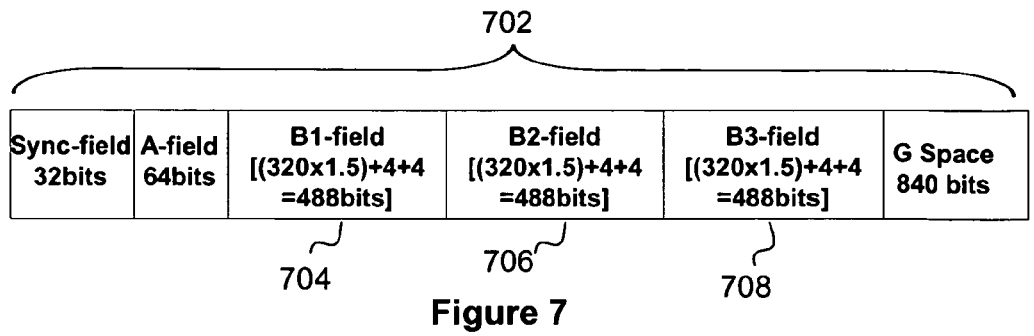
FIG. 7 illustrates a double extended slot arrangement, according to an embodiment of the present invention.

FIG. 7 illustrates a double extended slot arrangement, according to an embodiment of the present invention, in which a 0.87 μs bit width is employed. In this example, there are 2304 bits in double extended slot 702, excluding one 32 bit sync and one 64 bit A field. Slot 702 includes three B-field voice transmission sub-slots 704, 706, 708, each having the forward error correction architecture of FIG. 4. In this case, three separate voice packets can be transmitted, one each within slot 704, 706, and 708.

Figure 7A:
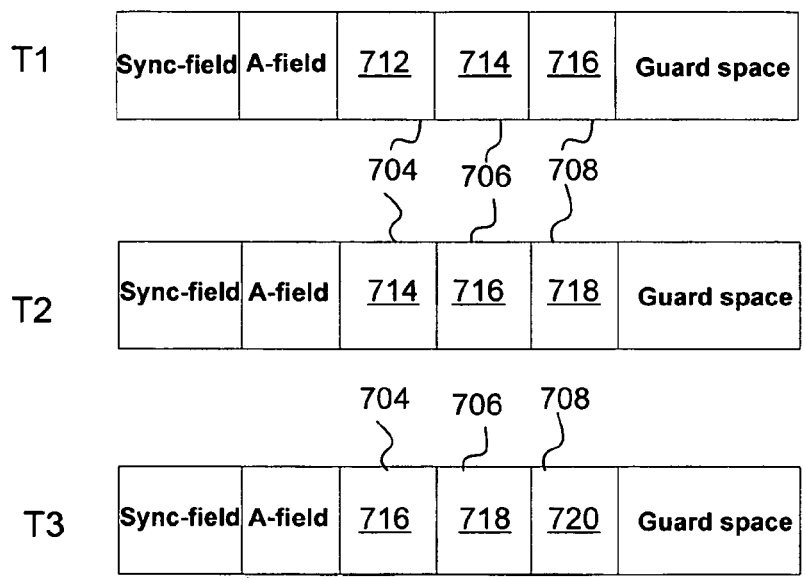
FIG. 7a illustrates operation of data packet transmission using the arrangement of FIG. 7.

For example, as illustrated in FIG. 7a, at time T1 of a first transmission frame, slots 704, 706, and 708 contain data packets 712, 714 and 716, respectively. At time T2 of a second transmission frame 720, spaced 10 ms after T1, slots 704, 706, and 708 contain data packets 714, 716, and 718, respectively. At time T3 of a third transmission frame, spaced 20 ms after T1, slots 704, 706, and 708 contain data packets 716, 718, and 720, respectively. According to this scheme, each data packet is transmitted three times in successive 10 ms frames. Each data packet can represent 10 ms of audio data on the receiving end. Thus, within each frame, 10 ms of new audio data, representing a data packet not previously sent, is transmitted. In the example of FIG. 7a, at a receiver (not shown) a good copy of data packet 716 can be chosen from three copies that are received after T3. Hence, by using an extended double slot for diversity, three copies of a data packet can be transmitted, at three different frequencies across three different time frames, improving resilience against time-based interference. In addition, as shown in FIG. 7, sufficient bits are available to perform FEC with each B-field to increase the quality of voice transmission.

Alternatively, in an environment having heavy RF interference, data transmission may be sufficiently impaired that even using three data packet copies that are transmitted in sequential frames, some damaged portions will be encountered in each data packet copy. In the latter case, the present invention as disclosed in FIG. 7a, provides the ability of a receiver of the data packets to select undamaged portions from each and every copy in order to assemble a complete undamaged version of the data packet, resulting in reception of the best B-field data possible under the circumstances.

For example, each data packet copy can be subdivided into subpackets as discussed above with respect to FIGS. 3b and 3c. Referring both to FIGS. 7a and 3c, packet 716 can be configured similarly to B-field 302 of FIG. 3b, having 32 bit sub-packets 314 spaced by error correction bits 316. If errors are encountered in data packet 716 each time it is sent in three successive frames T1-T3, a good copy of data packet 716 can be assembled at a receiving end by selecting an assemblage of good sub-packets 314 corresponding to a complete data packet, where the assemblage of sub-packets is derived from two or three of the transmitted copies of data packet 716. In addition, if it is determined that portions of the data packet contain errors in all three copies, before assembly of a good data packet, individual subpackets from one or more of the transmitted copies 716 can be corrected using FEC methods as discussed above. Accordingly, a copy of good data packet 716 can be assembled by assembling individual sub-packets taken from different copies of redundantly transmitted data packets, using a combination of good sub-packets and/or sub-packets that can be forward error corrected. In the case of sub-packets of data packet 716 that cannot be corrected by forward error correction, majority voting based on the three received copies of data packet 716 can be used to assemble a best possible sub-packet or sub-packets.

Figure 8:
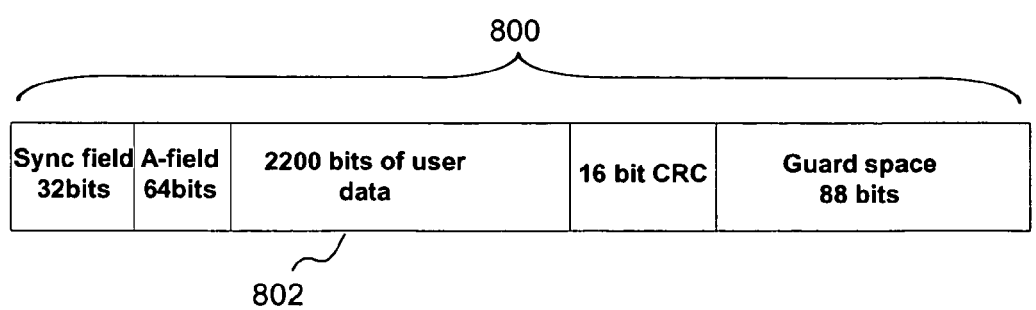
FIG. 8 illustrates a double extended slot having enhanced non-voice data transmission rate, arranged according to a further embodiment of the present invention.

FIG. 8 illustrates a double extended slot 800 having enhanced non-voice data transmission rate, arranged according to a further embodiment of the present invention. In this example, of 2304 bits available (excluding Sync and A fields), 2200 bits are allocated to user data slot 802. In comparison to the known double extended slot illustrated in FIG. 6, having 800 bits of data available for data transmission, the data transmission rate is nearly tripled. Thus, an effective data transmission rate of over 200 Kbps can be achieved using the arrangement of double extended slot 800. Such data rates enable many applications, such as web browsing, that operate with difficulty at rates lower than about 128 kbps.

Although the examples of FIGS. 7, 7a, and 8 are directed to WDCT frame arrangements in which one double extended slot is employed, the present invention can be practiced using two double extended slots. For example, in a case where only two duplex links are needed, two double extended slots each with the capability of 200+ Kpbs data transmission rates can be employed.

Figure 9:
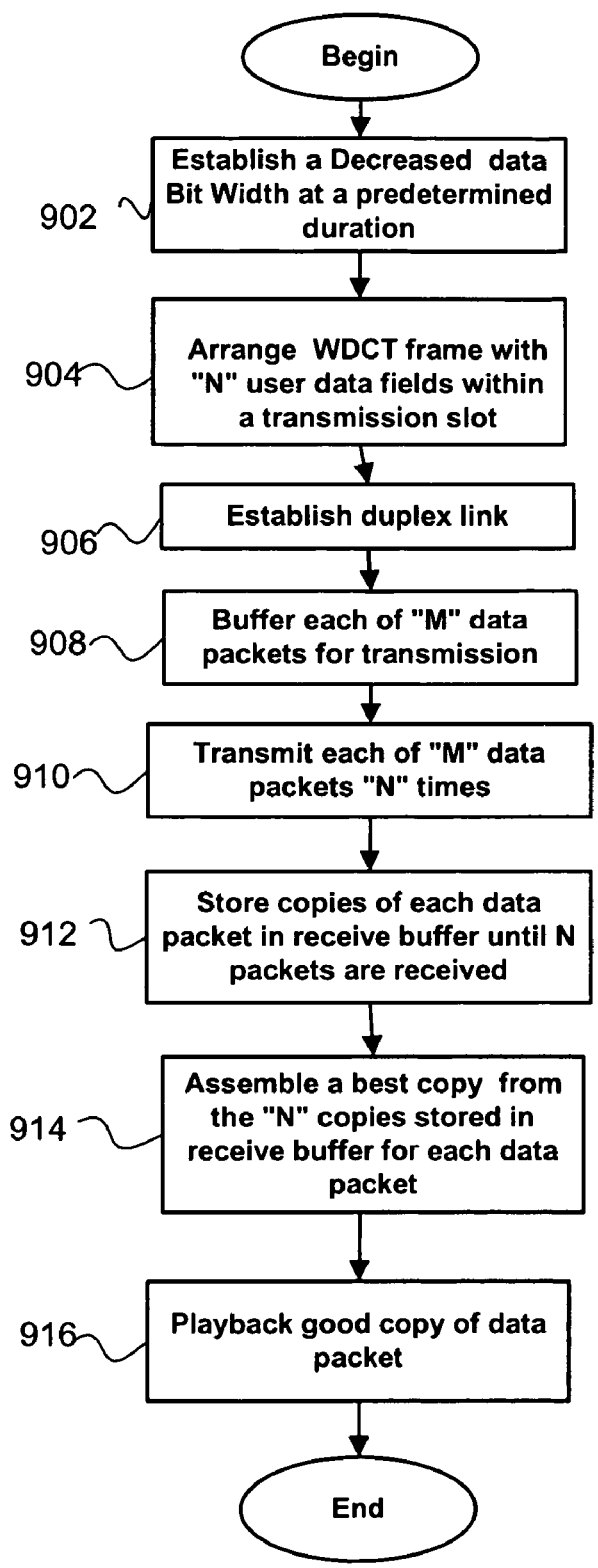
FIG. 9 illustrates exemplary steps involved in a method for improved data transmission in a TDMA system, according to an exemplary embodiment of the present invention.

FIG. 9 illustrates exemplary steps involved in a method for improved data transmission in a TDMA system, according to an exemplary embodiment of the present invention. In step 902, a data bit width smaller than a conventional WDCT data bit width is established for use in a WDCT system. Preferably, the data bit width is about 0.87 μs. For example, known hardware can be employed to produce the smaller data bit width.

In step 904, a WDCT frame structure is arranged to provide a plurality of user data fields within a designated transmission slot. The transmission slot can be, for example, a conventional single slot of 840 μs duration or a double extended slot of 2400 μs duration, as discussed above. The exact bit size of the user data fields can be adjusted, but preferably the size of each of N user data fields is the same. For example, each user data field could contain 320 bits of user voice data.

In step 906, a duplex WDCT link is established. For example, a link is established between a portable handset and base station of a cordless audio device. Preferably, the frame duration is the standard 10 ms used in WDCT.

Figure 10:
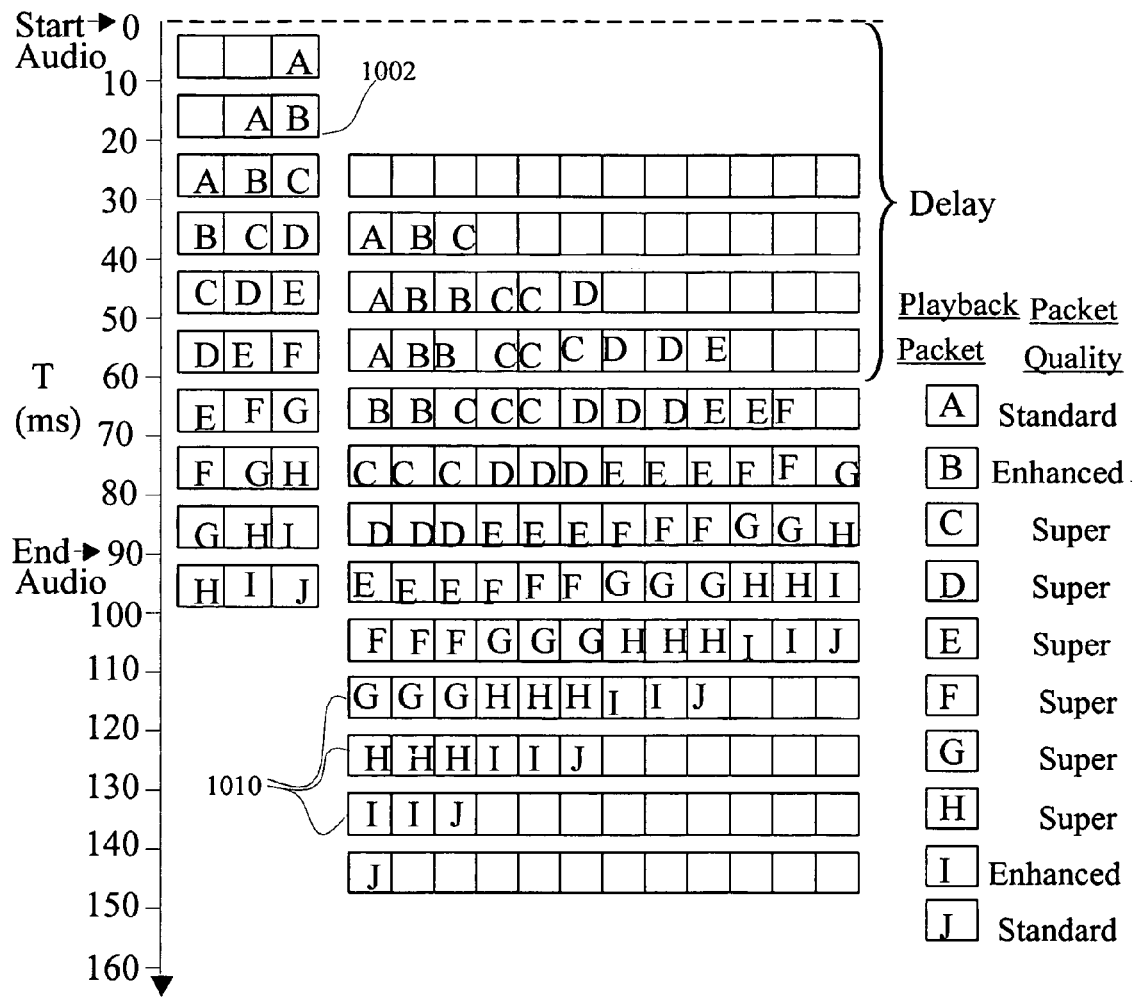
FIG. 10 illustrates a system for enhanced transmission of voice data packets, according to one embodiment of the present invention.

In step 908, each of M data packets is buffered in a buffer for transmission. The buffering of M data packets preferably occurs in a sequential chronological manner. For example, as illustrated in FIG. 10, at any given time, N=3 data packets comprising 10 ms audio samples of received audio are buffered in a transmitting device such as a portable handset. Each data packet is buffered for transmission in one of the N user data fields provided in the transmission slot.

In the exemplary system of FIG. 10, a buffer region 1002 capable of retaining 30 ms of audio data receives 10 ms audio samples, as indicated. For instance, a user employing a handset establishes a duplex link in which the fixed-to-portable frame structure is as in FIGS. 7 and 7a, where N=3, size of user fields 704-708 is 320×1.5 bits, and slot size of transmission slot 702 is a double extended slot spanning 2400 ms, as described in more detail above. After 30 ms, 10 ms audio data packets A, B, and C sent to buffer region 1002 fill the buffer region.

In step 910, N copies of each of M data packets is transmitted, where one copy of each data packet is sent in N consecutive frames. In the example of FIG. 10, where N=3 and M=9 (data packets A to I), each data packet is sent three times in three successive frames. After a first copy of a data packet is sent, the field position within a transmission slot used for subsequent sending of copies can be altered as indicated, for example, in FIGS. 3a and 7a. After transmission of N copies of a given data packet, the data packet can be removed from the transmitting buffer. For example, if N=3 as in FIG. 10, a 10 ms data packet resides in buffer 1002 for 30 ms, corresponding to the duration of three consecutive WDCT frames.

It will be noted, as detailed further below, that in the system of FIG. 10, the first and last data packets are not transmitted three times. However, for a realistic voice transmission lasting several seconds or longer, the value of M is at least several hundred. Accordingly, the vast majority of M packets are transmitted N times according to the method of FIG. 9.

In step 912, copies of the M transmitted data packets are stored in a receiving buffer of a receiving device until N copies are received. In the example of FIG. 10 where N=3, receiving buffer 1010 receives one copy of each transmitted data packet every 10 ms over a total time of 30 ms. Thus, the total amount of data packet copies stored increases over a 30 ms time span.

In step 914, the receiving device assembles a best copy from the N transmitted copies, for each of the M packets. The assembly process may simply involve identifying and selecting which copy of the N copies is transmitted with no errors or the least errors. Alternatively, as discussed above, the assembly process can proceed to build a new data packet copy having fewer errors than any of the transmitted copies by selecting good sub-packets from portions of two or more of the N copies, including sub-packets that are forward error corrected.

In step 916, the assembled best copy of the first data packet is transmitted from the receiving buffer for playback in the receiving device.

As noted in FIG. 10, for the example of N=3, most of the packets are transmitted three times, the first and last only transmitted once, and the second and penultimate packets transmitted twice. Thus, as judged by a quality factor, most played back packets are of optimum quality (three copies to choose a best copy from), two of enhanced quality (two copies to choose from), and two are of standard quality.

In the above method, 10 ms of audio data in each packet of N packets can be transmitted in every 10 ms data frame. In principle, using a double extended slot structure, N can equal 4 or 5, for example. However, because total delay time between transmission and playback of a sample increases with N, for playback of buffered voice data packets, improvements in echo cancellation and related technology may be necessary to extend this scheme when N is larger than about 4. For example, in the case of FIG. 10, where M=3, the delay between sending audio into the transmitting buffer and playing back in the receive buffer is about 60 ms. Delays significantly longer than this may have a perceptible impact on audio quality. In addition, for transmission of multiple data packets within a single 840 μs slot, transmission of more than two 320 bit data packets requires further reduction in bit width below 0.87 μs.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, although the above embodiments are directed to a WDCT system, which employs frequency hopping for communication, the modifications of slot structure disclosed can be applied to a non-frequency hopping TDMA scheme. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for increasing a payload in a time division multiple access frame, comprising:
   a transmitting device configured to transmit digital data bits having a reduced data bit width having a duration that is smaller by an integer factor N than a conventional WDCT bit width of a TDMA technology, wherein the transmitting device is configured to transmit the digital data bits in a frame structure of an RF duplex link, the frame structure comprising:
   an enhanced user data field having larger bit size by the integer factor N than a user data field size of a conventional frame of the TDMA technology, wherein the enhanced user data field comprises the integer factor N number of data fields compared to conventional TDMA technology, wherein each data field comprises data packets, wherein a first data packet and a copy of the first data packet are sent in consecutive frames, and wherein the enhanced user data field is configured to send N different data packets within a single frame; and
   a frame duration the same as a conventional WDCT frame of the TDMA technology, wherein a data payload transmitted over a duplex link having a first slot of a first slot size is larger by the integer factor N than a data payload of a conventional WDCT frame structure of the TDMA technology having the first slot size.

2. The system of claim 1, wherein the first slot comprises a single transmission slot spanning a duration of 840 μs.

3. The system of claim 2, wherein the enhanced user data field comprises two data fields each including 320 bits of user data.

4. The system of claim 2, wherein the enhanced user data field comprises a single field including 320 user data bits arranged in voice data bit blocks interspersed with error correction blocks.

5. The system of claim 4, wherein the voice data blocks comprise 10 bits and the error correction blocks comprise 5 bits.

6. The system of claim 2, wherein the enhanced user data field comprises a single field including 800 bits of non-voice user data.

7. The system of claim 2, wherein the first slot comprises a double extended slot spanning a duration of 2400 μs.

8. The system of claim 7, wherein the enhanced user data field comprises a single user data field configured to send user data packets of 2200 bits.

9. The system of claim 1, wherein each data field includes a plurality of user data blocks and a plurality of parity bits.

10. The system of claim 9, wherein a user data block size is 32 bits and a parity block size is one bit.

11. The system of claim 9, wherein a user data block size is 32 bits and a parity block size is three bits.

12. The system of claim 1, wherein each user data field includes user data blocks and error correction data blocks.

13. The system of claim 1, wherein N=3.

14. The system of claim 13, wherein each data packet is sent three times in three consecutive frames.

15. The system of claim 1, wherein the TDMA technology comprises a WDCT standard, and wherein the bit width is 0.86 μs.

16. A method for improved data transmission in a TDMA system, comprising:
   establishing a data bit width smaller than a conventional WDCT data bit width of a TDMA technology by a factor of N, where N is an integer greater than one;
   arranging a frame structure of the TDMA technology to provide N user data fields within a designated transmission slot, each user field comprising a data packet;
   buffering each data packet in a transmitting device buffer;
   transmitting N copies of each data packet in consecutive frames of the TDMA frame structure, such that each frame of the TDMA frame structure comprises a sequence of N different data packets in the N user fields;
   storing the copies of the data packets in a receiving buffer of a receiving device until the N copies are received;
   assembling a best copy from the N copies of the data packet stored in the receiving buffer by selecting good sub-packets from portions of the N copies of the data packet and building a new copy of the N copies of the data packet using the good sub-packets; and
   transmitting the best copy of the first data packet from the receiving buffer for playback in the receiving device.

17. The method of claim 16, further comprising establishing a duplex TDMA link.

18. The method of claim 16, wherein the designated transmission slot comprises a single slot spanning 840 μs and containing two user data fields.

19. The method of claim 18, wherein the user data fields comprise 320 bits of user voice data.

20. The method of claim 16, wherein the designated transmission slot comprises a double extended slot structure spanning 2400 μs.

21. The method of claim 16, wherein the designated transmission slot includes three user data fields each comprising 320 bits of user voice data.

22. The method of claim 16, further comprising:
   performing forward error correction of sub-packets corresponding to portions of the data packet where errors exist in each of the N copies; and
   using the forward error corrected sub-packets to build the new copy of the N copies of the data packet.

* * * * *

UNITED STATES PATENT AND TRADEMARK OFFICE
CERTIFICATE OF CORRECTION

| | | |
|---|---|---|
| PATENT NO. | : 7,924,765 B2 | Page 1 of 1 |
| APPLICATION NO. | : 11/065056 | |
| DATED | : April 12, 2011 | |
| INVENTOR(S) | : Chen et al. | |

It is certified that error appears in the above-identified patent and that said Letters Patent is hereby corrected as shown below:

Column 10, line 11, delete "of" and insert --including--.

Signed and Sealed this
Twenty-second Day of November, 2011

David J. Kappos
*Director of the United States Patent and Trademark Office*